March 14, 1939.  G. R. LEWERS  2,150,231
INCINERATION
Filed Oct. 15, 1936
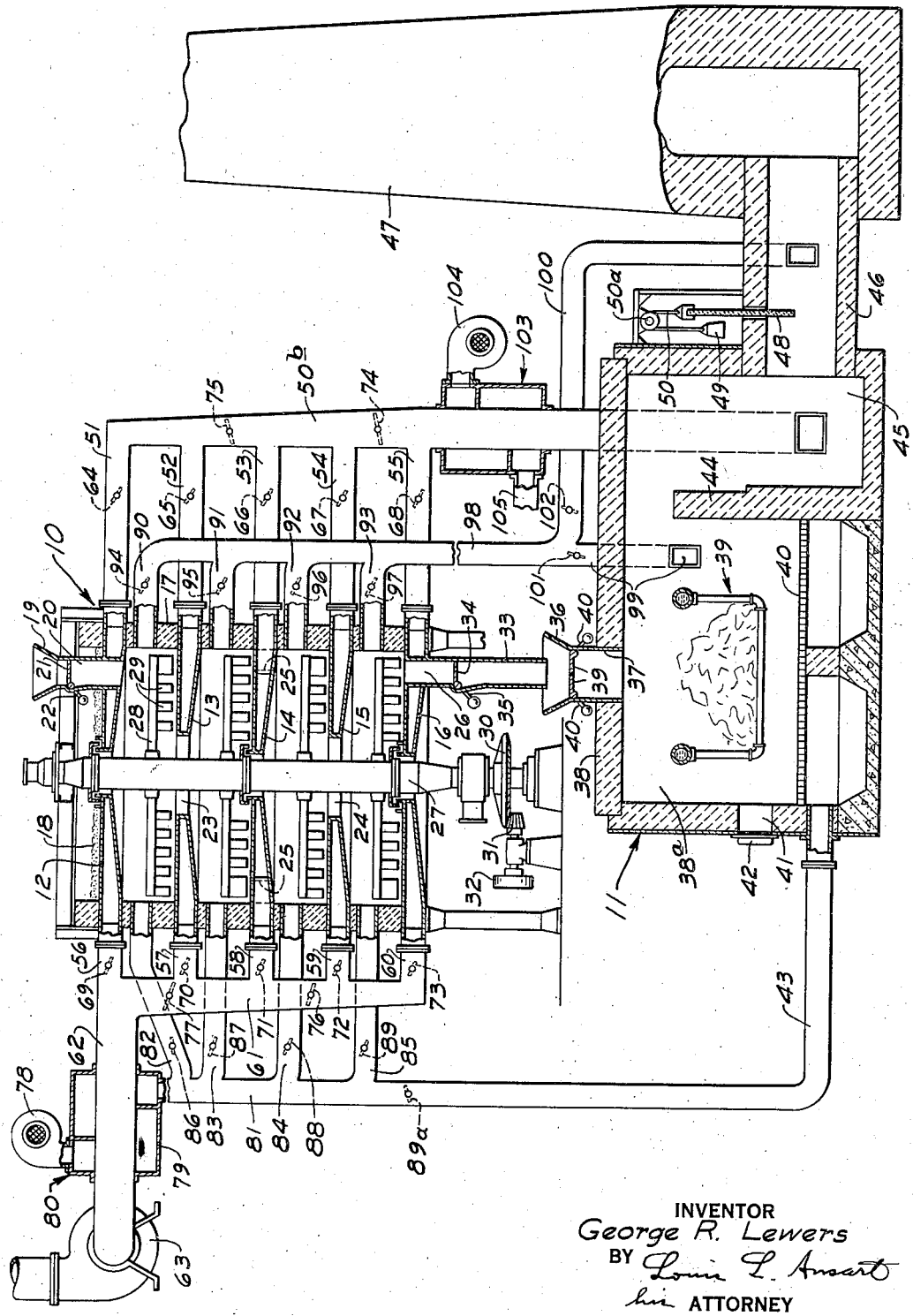
INVENTOR
George R. Lewers
BY Louis L. Ansart
his ATTORNEY Patented Mar. 14, 1939

2,150,231

UNITED STATES PATENT OFFICE 2,150,231

INCINERATION

George R. Lewers, Brooklyn, N. Y., assignor, by mesne assignments, to Underpinning & Foundation Company, Inc., New York, N. Y., a corporation of New York Application October 15, 1936, Serial No. 105,695

5 Claims. (Cl. 110—8)

My invention relates to the incineration or burning of material containing moisture and volatile material, and more particularly to the disposal in this way of material such as sewage sludge, sewage screenings, garbage and municipal waste in general.

The principal objects of the invention are to provide a novel and advantageous apparatus and a novel and advantageous process for drying and burning material, particularly material of the general type specified.

Heretofore it has been proposed to dry material in a multiple-hearth dryer or furnace and then to burn the dried material in a refuse incinerator, of the Decarie type for example, and to conduct hot waste gases from the incinerator through the multiple-hearth dryer in contact with the material on the hearths for heating and drying purposes and then to return the gases to a hot part of the incinerator, and also to recover waste heat by use of heat exchangers exterior to the drying furnace.

In carrying out my invention, heat exchangers exterior to the burning furnace may either be eliminated or may be used in a different way. As an illustration, I propose to use a Decarie incinerator adjacent to which is a multiple-hearth dryer or drying furnace which is similar to multiple-hearth roasting furnaces used in the metallurgical industry except that use is made of hollow hearths of heat conducting material, such as steel, cast iron or other suitable material. Such hollow hearths or drying trays may be in the form of hollow annular chambers through which all or part of the hot gases from the incinerator may be passed, either in multiple, or in series, or partly in multiple and partly in series. From the hollow hearths the gases may be passed to a heat saving device, such as a heat exchanger, and eventually to a stack. The temperature of the gases entering the dryer may be reduced by admitting cold air.

Heated air from a heat exchanger may be passed over the material being dried in the dryer and the resulting moisture laden gas may then be conducted from the dryer to the hot zone of the incinerator where odors are destroyed and the resulting gases mixed with gases produced in the incinerator are passed to the stack. If the temperatures within the dryer are controlled to a range wherein noxious odors are not produced in the drying operation, the moisture laden gases may be discharged directly to the stack instead of being passed to the incinerator for the elimination of odor. A second heat exchanger may be used so that the hot gases from the incinerator before entering the drying hearths or trays will heat fresh air which may be used in connection with the drying operation.

Other objects, features and advantages will appear upon consideration of the following description and of the drawing in which the figure is a sectional elevation of an approved form of the apparatus.

Referring to the drawing, the apparatus comprises a multiple-hearth dryer or drying furnace 10 and a basket-grate furnace 11 of the Decarie type. The dryer 10 may comprise a top 12, hearths 13, 14, 15 and 16, which hearth 16 serves as the bottom of the dryer or drying furnace 10. In order to promote drying of the material under treatment, the top 12 and the hearths 13, 14, 15 and 16 may be hollow and made of heat conducting material such as steel or cast iron. The said top and hearths are spaced apart vertically and supported in a peripheral wall 17. The furnace may be provided above the top 12 with any suitable insulating material such as sand 18.

The material to be dried may be introduced into the top of the dryer through a hopper 19 and a chute 20 extending through the top 12 and provided with a pivoted door 21 normally held in closed position by a weighted arm 22 but arranged to open when a sufficient quantity of material has accumulated thereon. The material thus introduced into the uppermost compartment or zone will fall upon the hearth 13. In order to subject the material to as much contact as possible with the air and gases passing through the dryer and to enable the material to pass downwardly through and out of the dryer, the hearths 13 and 15 are provided with central discharge openings or outlets 23 and 24 respectively and hearths 14 and 16 are provided with peripheral outlets 25 and 26.

The material may be worked to the outlets of the various hearths by suitable rabbling means which may comprise a vertical shaft 27, passing freely through the central outlets 23 and 24 of the hearths 13 and 15 and through gas seals at the hearths 14 and 16 and at the top 12, and rabbling devices extending over said hearths from the vertical shaft and consisting of arms 28 and blades 29 so inclined at each hearth as to work the material on the hearths to the corresponding outlets. The shaft 27 may be driven by suitable means such as a bevel gear 30 and a pulley 32 secured to gear 31 and driven from any suitable source of power. When the material on the lowermost hearth or bottom 16 is worked outwardly and around to the outlet 26, it drops into a chute 33 on a pivoted door 34 normally held in closed position by a suitable weighted arm 35. When a sufficient amount of material has accumulated thereon, the door 34 swings open and dried material is discharged from the dryer.

The dried material discharged from the chute 33 at the bottom of the dryer may drop into a hopper 36 at the top of a chute 37 extending through the top 38a of the furnace 11. The chute 37 may normally be closed by suitable means such as two pivoted gates or doors 39 normally held in closed position by weighted arms 40.

Material entering the incinerator 11 through the chute 37 passes into a burning chamber 38a and falls into a water-cooled basket grate 39 above a fire or burning grate 40. The gases of combustion rising from material burning on the grate 40 pass around and to some extent through the material in the basket grate 39 and dry and partially burn it so that in course of time the material will drop through the basket grate and fall on the grate 40. The material thus falling on the grate 40 may be sufficient to maintain the operation of the furnace, but, if the amount is insufficient, auxiliary fuel may be introduced in any suitable manner, for example, through a port 41 normally closed by a door 42 or by means of an oil burner. Air may be supplied beneath the grate 40 in any suitable manner, for example, through a duct or pipe 43. The hot gases from the burning chamber 38 pass upwardly over a bridge wall 44 into the upper part of a combustion chamber 45 in which the combustible gases are finally burned. From the lower part of the combustion chamber 45 the hot gases pass through a flue 46 to a stack 47, the flow of gases through the flue 46 being controlled by suitable means such as a damper 48 movable vertically and counterbalanced by a weight 49 connected with the damper 48 by means of a flexible member 50 passing over a pulley 50a.

The hollow hearths of the dryer 10 may be heated by passing therethrough hot gases of combustion from the incinerator preferably from the combustion chamber 45. To this end there is provided a manifold 50b connected with the combustion chamber 45 and connected through branches or ducts 51, 52, 53, 54 and 55 with the hollow hearths 12, 13, 14, 15 and 16, respectively. The same hearths are also connected by ducts 56, 57, 58, 59 and 60 with a manifold 61 connecting with a duct 62 through which the hot gases are drawn by means of a large fan 63. With this arrangement hot gases from the combustion chamber 45 of the incinerator will be drawn through the hollow hearths and discharged from the apparatus in any suitable manner. By providing the ducts 51, 52, 53, 54 and 55 with dampers 64, 65, 66, 67, and 68 respectively, and by providing the ducts 56, 57, 58, 59 and 60 with dampers 69, 70, 71, 72 and 73 respectively any one of the hollow hearths may be shut off and the hot gases passed through the other hearths. Also by providing a damper 74 in the manifold 50 between the ducts 54 and 55, and a damper 75 between the ducts 52 and 53 and providing the manifold 61 between the ducts 58 and 59 with a damper 76 and between the ducts 56 and 57 with a damper 77, it is made possible to pass the gases through the hollow hearths either in multiple or in series.

It is also desirable to supply preheated air to the various compartments of the dryer 10 and to the incinerator 11 below the grate 40. To this end there may be provided a fan 78 forcing air through a duct 79 surrounding the outlet duct 62 for the hot gases and cooperating therewith to form a heat exchanger 80 whereby preheated air is supplied to a manifold 81 having branches or ducts 82, 83, 84 and 85 as well as the duct 43 leading to the incinerator 11 which ducts are controlled respectively by dampers 86, 87, 88 and 89. After passing through the compartments above the corresponding hollow hearths, the air laden with moisture and vapors passes out of the dryer into branches or ducts 90, 91, 92 and 93 controlled by dampers 94, 95, 96 and 97. From the ducts 90 to 93 inclusive, the air and vapors pass to a manifold 98 connected by a branch 99 with the burning chamber of the incinerator 11 and by a branch 100 with the flue 46 leading to the stack 47, these branches 99 and 100 being controlled by dampers 101 and 102 respectively.

If desired, a heat interchanger 103 may be provided along the manifold 50b and air may be forced therethrough by means of a fan 104 to a duct 105 to deliver the preheated air to any desired point in the apparatus, for example, to the manifold 81.

During the normal operation of the apparatus, material which may be sewage sludge, is supplied to the hopper 19 and is fed by gravity past the pivoted door 21 and through the chute 20 into the upper compartment where it falls on the hearth 13. By the action of the rabbling means, the material is in general kept in a single layer on each hearth and is fed by the blades 29 inwardly to the central openings 23 and 24 of hearths 13 and 15 and outwardly to the peripheral openings 25 and 26 in the hearths 14 and 16, thus being fed gradually downwardly to the bottom of the dryer 10 to the outlet 26.

From the outlet 26 of the dryer 10, the dried material is fed intermittently into the burning or furnace chamber 38a of the incinerator 11 where it is received in the basket grate 39. Here it is subjected to hot gases of combustion resulting from the burning of material on the fire grate 40 and after further drying and more or less charring and burning, falls to the grate 40 and serves as fuel for drying and burning the other material deposited in basket grate 39. The gases of combustion pass over the bridge wall 44 into the gas combustion chamber 45 and then through the flue 46 to the stack which provides a natural draft which can be regulated by the damper 48.

Part of the drying action in the dryer 10 may be obtained by taking hot gases of combustion from the incinerator, preferably from the combustion chamber 45, and passing them through the manifold 50b and the branches 51, 52, 53, 54 and 55 into the hollow trays 13, 14, 15 and 16, and out of the hollow hearths through ducts 56, 57, 58, 59 and 60 to a manifold 61 connected to a discharge pipe or duct 62 provided with the suction fan 63. Obviously the hot gases serve to heat the hollow hearths and to heat and dry the material on the various hearths. By means of the dampers in the manifolds and the branches connected therewith, the flow of gases through the hollow hearths may be controlled substantially as required or desired. Ordinarily the gases flow through the hearths in multiple, but by shifting the dampers 74, 75, 76 and 77, the gases may flow through the hollow hearths in series.

The fan 78 serves to supply air to the heat exchanger 80 and therefrom to the manifold 81. From the manifold 81, the preheated air passes through the duct 43 to a position below the fire grate 40, and through the ducts 82, 83, 84 and 85 to the compartments over the hearths 13, 14, 15 and 16 respectively. From these compartments the air passes out through branches or ducts 90, 91, 92 and 93 to a manifold 98, and from the manifold 98 the air and vapors taken up thereby pass to the furnace chamber 38a, or to the flue 46, or partly to one and partly to the other as determined by the dampers 101 and 102.

By use of a heat interchanger 103, heat may be taken from the hot gases in manifold 50b and at the same time air may be preheated for use where desired, for example in the furnace chamber 38a.

It will be seen that very effective and economical drying and burning may be effected by use of the apparatus of the present invention.

Although the inlets and outlets of the hollow hearths are illustrated as being at opposite sides of the dryer, they may be at the same side of the dryer, the inlet and outlet for each hollow hearth being at opposite sides of a radial partition, as disclosed in my copending application, Serial No. 103,875, filed October 3, 1936.

It should be understood that various changes may be made and various features used without others without departing from the true scope and spirit of the invention.

Having thus described my invention, I claim:

1. In combination, a multiple-hearth dryer divided into compartments by vertically spaced hollow trays serving as the top and the hearths and having means for moving material introduced at the top downwardly from tray to tray and discharging it at the bottom, an incinerator receiving material from the dryer and comprising a furnace chamber and a combustion chamber connected at its upper part with the upper part of the furnace chamber, means for passing hot gases from said combustion chamber to each of said hollow trays, a heat exchanger connected with all of said hollow trays to receive gases therefrom, means for drawing the hot gases from said trays through said heat exchanger, means for introducing air preheated in said heat exchanger into each of the compartments between said trays and into said furnace chamber and withdrawing air and vapors from each of said compartments and discharging them into said furnace chamber.

2. In combination, a multiple-hearth dryer divided into compartments by vertically spaced hollow trays serving as the top and the hearths and having means for moving material introduced at the top downwardly from tray to tray and discharging it at the bottom, an incinerator receiving material from the dryer and comprising a furnace chamber and a combustion chamber connected at its upper part with the upper part of the furnace chamber, a flue receiving hot gases from the lower part of the combustion chamber, means for passing hot gases from said combustion chamber to each of said hollow trays, a heat exchanger connected with all of said hollow trays to receive gases therefrom, means for drawing the hot gases from each of said trays through said heat exchanger, means for introducing air preheated in said heat exchanger into each of the compartments between said trays and into said furnace chamber and withdrawing air and vapors from each of said compartments and means for discharging air and vapors from the compartments into said flue.

3. In combination, a multiple-hearth dryer comprising compartments between vertically spaced hollow trays serving as the top and the hearths and means for moving material introduced at the top downwardly from tray to tray and discharging it at the bottom, an incinerator comprising a furnace chamber receiving material from the dryer and a combustion chamber connected at its upper part with the upper part of the furnace chamber, a discharge flue connected with the lower part of the combustion chamber, a hot-gas manifold connected at its lower end to said combustion chamber, branch ducts connecting the hot gas manifold with corresponding hollow hearths, a discharge manifold connected with said trays to receive hot gases therefrom, dampers for said branch ducts and manifolds whereby the hot gases may be caused to pass through said hollow trays in parallel or in series, a heat exchanger connected with the discharge manifold and heated by the hot gases from the same, means for drawing the hot gases through said hollow trays and said heat exchanger, means for passing air through said heat exchanger to be heated therein, an air-supply manifold receiving heated air from said heat exchanger, branch ducts supplying the preheated air from said air-supply manifold to said compartments between the hollow trays and to said furnace chamber, an air discharge manifold, branch ducts connecting said compartments with said air-discharge manifold, air-control dampers whereby the preheated air may be passed through said compartments in parallel or in series, branch ducts connecting said air-discharge manifold with said furnace chamber and said flue respectively, and dampers for controlling the flow of air through said last mentioned branch ducts.

4. In combination, a multiple-hearth dryer comprising compartments between vertically spaced hollow trays serving as the top and the hearths and means for moving material introduced at the top downwardly from tray to tray and discharging it at the bottom, an incinerator comprising a furnace chamber receiving material from the dryer and a combustion chamber connected at its upper part with the upper part of the furnace chamber, a discharge flue connected with the lower part of the combustion chamber, a hot-gas manifold connected at its lower end to said combustion chamber, branch ducts connecting the hot gas manifold with corresponding hollow hearths, a discharge manifold connected with said trays to receive hot gases therefrom, a heat exchanger heated by the hot gases from the combustion chamber, means for drawing the hot gases through said hollow trays and manifolds, means for passing air through said heat exchanger to be heated therein, an air-supply manifold receiving heated air from said heat exchanger, branch ducts supplying the preheated air to said compartments between the hollow trays and to said furnace chamber, an air discharge manifold, branch ducts connecting said compartments with said air-discharge manifold, branch ducts connecting said air-discharge manifold with said furnace chamber and said flue respectively, and dampers for controlling the flow of air through said last mentioned branch ducts.

5. In combination, a multiple-hearth dryer comprising compartments between vertically spaced hollow trays serving as the top and the hearths and means for moving material introduced at the top downwardly from tray to tray and discharging it at the bottom, an incinerator comprising a furnace chamber receiving material from the dryer and a combustion chamber connected at its upper part with the upper part of the furnace chamber, a hot-gas manifold connected at its lower end to said combustion chamber, branch ducts connecting the hot gas manifold with corresponding hollow hearths, a discharge manifold connected with said trays to receive hot gases therefrom, a heat exchanger connected by the hot gases from the combustion chamber, means for drawing the hot gases through said hollow trays and manifolds, means for passing air through said heat exchanger to be heated therein, an air-supply manifold receiving heated air from said heat exchanger, branch ducts supplying the preheated air to said compartments between the hollow trays, an air discharge manifold, branch ducts connecting said compartments with said air-discharge manifold, and means for conducting air from said air-discharge manifold to said furnace chamber.

GEORGE R. LEWERS.